(12) United States Patent
Sunder

(10) Patent No.: US 6,513,795 B2
(45) Date of Patent: Feb. 4, 2003

(54) MIXED-RESISTANCE STRUCTURED PACKING

(75) Inventor: Swaminathan Sunder, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/183,913

(22) Filed: Jun. 28, 2002

(65) Prior Publication Data

US 2002/0195727 A1 Dec. 26, 2002

Related U.S. Application Data

(63) Continuation of application No. 09/213,612, filed on Dec. 18, 1998, now Pat. No. 6,425,574.

(51) Int. Cl.[7] .................................................. B01F 3/04
(52) U.S. Cl. ................ 261/94; 261/112.2; 261/DIG. 72
(58) Field of Search ............................. 261/94, 96, 97, 261/109, 110, 112.2, DIG. 72

(56) References Cited

U.S. PATENT DOCUMENTS

| | | | | |
|---|---|---|---|---|
| 5,100,448 A | * | 3/1992 | Lockett et al. ........... | 261/112.2 |
| 5,456,865 A | | 10/1995 | Pluess et al. | |
| 5,486,318 A | * | 1/1996 | McKeigue et al. ...... | 261/112.2 |
| 5,725,810 A | * | 3/1998 | Brunner et al. .......... | 261/112.2 |
| 5,984,282 A | * | 11/1999 | Armstrong et al. ...... | 261/112.2 |
| 6,119,481 A | * | 9/2000 | Sunder ..................... | 261/112.2 |
| 6,170,805 B1 | * | 1/2001 | Hug et al. ................ | 261/112.2 |
| 6,425,574 B1 | * | 7/2002 | Sunder ..................... | 261/112.2 |

FOREIGN PATENT DOCUMENTS

| | | |
|---|---|---|
| GB | 774 906 | 2/1956 |
| GB | 929 030 | 6/1963 |
| JP | 48-106017 | 5/1975 |

* cited by examiner

*Primary Examiner*—C. Scott Bushey
(74) *Attorney, Agent, or Firm*—Willard Jones III

(57) ABSTRACT

A layer of mixed-resistance structured packing includes: a first structured packing having a first packing resistance; and a second structured packing generally horizontally adjacent the first structured packing, the second structured packing having a second packing resistance different than the first packing resistance. The layer of mixed-resistance structured packing is used in exchange columns for exchanging heat and/or mass between a first phase and a second phase in processes such as cryogenic air separation. Use of the layer of mixed-resistance structured packing reduces HETP (height equivalent to a theoretical plate) in the exchange columns and processes. A method also is provided for assembling the layer of mixed-resistance structured packing in an exchange column.

11 Claims, 6 Drawing Sheets

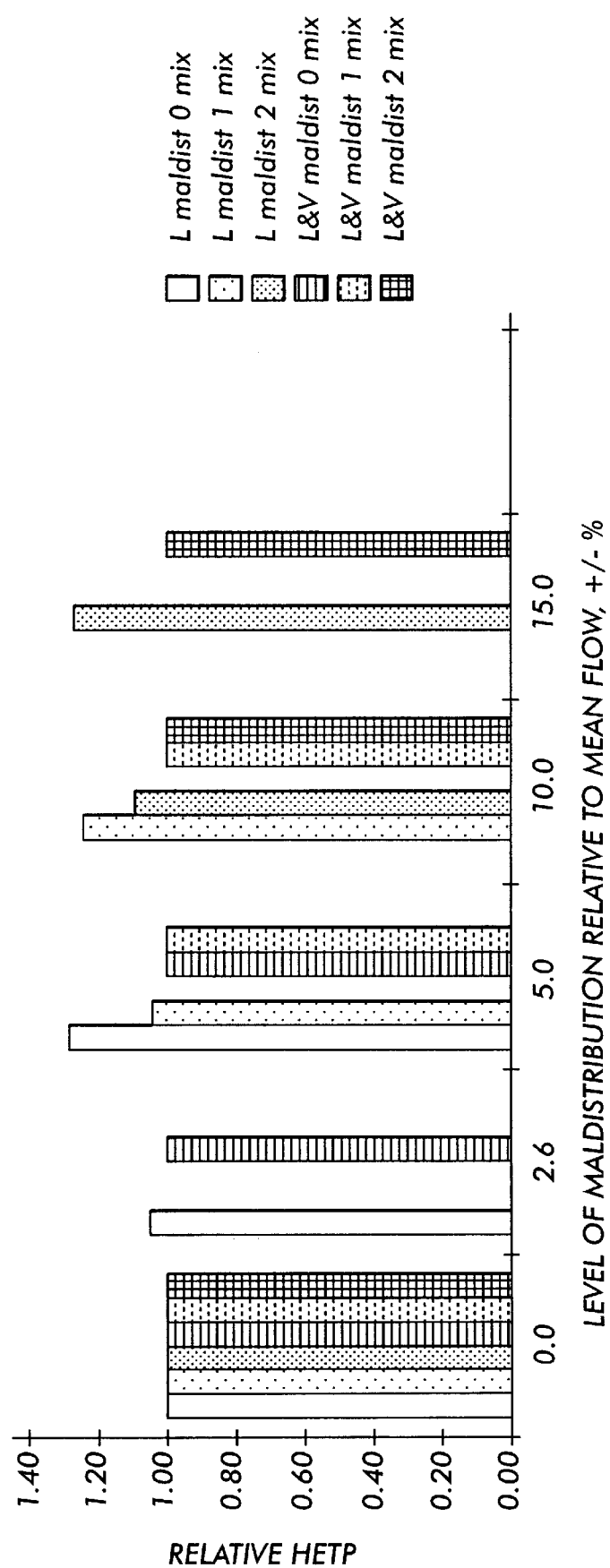

MIXED-RESISTANCE STRUCTURED PACKING

CROSS-REFERENCE TO RELATED APPLICATIONS

This application is a Continuation of Ser. No. 09/213,612, filed Dec. 18, 1998, now U.S. Pat. No. 6,425,574.

STATEMENT REGARDING FEDERALLY SPONSORED RESEARCH FOR DEVELOPMENT

Not Applicable

BACKGROUND OF THE INVENTION

The present invention relates to mixed-resistance structured packing and methods for assembling such packing in an exchange column. The mixed-resistance structured packing has particular application in exchange columns, especially in cryogenic air separation processes, although it also may be used in other heat and/or mass transfer processes that can utilize structured packing.

The term, "column", as used herein, means a distillation or fractionation column or zone, ie., a column or zone wherein liquid and vapor phases are countercurrently contacted to effect separation of a fluid mixture, such as by contacting of the vapor and liquid phases on packing elements or on a series of vertically-spaced trays or plates mounted within the column.

The term "column section" (or "section") means a zone in a column filling the column diameter. The top or bottom of a particular section or zone ends at the liquid and vapor distributors, respectively.

The term "packing" means solid or hollow bodies of predetermined size, shape, and configuration used as column internals to provide surface area for the liquid to allow mass transfer at the liquid-vapor interface during countercurrent flow of two phases. Two broad classes of packings are "random" and "structured".

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of expanded metal or woven wire screen stacked in layers or as spiral windings.

In processes such as distillation or direct contact cooling, it is advantageous to use structured packing to promote heat and mass transfer between counter-flowing liquid and vapor streams. Structured packing, when compared with random packing or trays, offers the benefits of higher efficiency for heat and mass transfer with lower pressure drop. It also has more predictable performance than random packing.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen). Various packings or trays may be used to bring the liquid and gaseous phases of the mixture into contact to accomplish mass transfer between the phases.

There are many processes for the separation of air by cryogenic distillation into its components (i.e., nitrogen, oxygen, argon, etc.). A typical cryogenic air separation unit 10 is shown schematically in FIG. 1. High pressure feed air 1 is fed into the base of a high pressure column 2. Within the high pressure column, the air is separated into nitrogen-enriched vapor and oxygen-enriched liquid. The oxygen-enriched liquid 3 is fed from the high pressure column 2 into a low pressure column 4. Nitrogen-enriched vapor 5 is passed into a condenser 6 where it is condensed against boiling oxygen which provides reboil to the low pressure column. The nitrogen-enriched liquid 7 is partly tapped 8 and is partly fed 9 into the low pressure column as liquid reflux. In the low pressure column, the feeds (3,9) are separated by cryogenic distillation into oxygen-rich and nitrogen-rich components. Structured packing 11 may be used to bring into contact the liquid and gaseous phases of the oxygen and nitrogen to be separated. The nitrogen-rich component is removed as a vapor 12, and the oxygen-rich component is removed as a vapor 13. Alternatively, the oxygen-rich component can be removed from a location in the sump surrounding reboiler/condenser 6 as a liquid. A waste stream 14 also is removed from the low pressure column. The low pressure column can be divided into multiple sections. Three such sections with packing 11 are shown in FIG. 1 by way of example.

The most commonly used structured packing consists of corrugated sheets of metal or plastic foils (or corrugated mesh cloths) stacked vertically. These foils may have various forms of apertures and/or surface roughening features aimed at improving the heat and mass transfer efficiency. An example of this type of packing is disclosed in U.S. Pat. No. 4,296,050 (Meier). It also is well-known in the prior art that mesh type packing helps spread liquid efficiently and gives good mass transfer performance, but mesh type packing is much more expensive than most foil type packing.

The separation performance of structured packing is often given in terms of height equivalent to a theoretical plate (HETP). The term "HETP" means the height of packing over which a composition change is achieved which is equivalent to the composition change achieved by a theoretical plate. The term "theoretical plate" means a contact process between vapor and liquid such that the existing vapor and liquid streams are in equilibrium. The smaller the HETP of a particular packing for a specific separation, the more efficient the packing because the height of packing being utilized decreases with the HETP.

The efficiency of distillation columns with structured packing shows a dependency on their diameter when all the other geometric and process factors are held constant. While performing equivalent separations at different scales, as the diameter increases from a small fraction of a meter to several meters, the HETP increases first and then tends to level out. This may be explained by a combination of two factors—the flow characteristics and the mixing characteristics of structured packing columns.

In terms of flow characteristics, even when the initial liquid and vapor distribution into a packed section of a column is highly uniform, the distribution changes as the liquid and vapor flow in countercurrent contact through the packed section, resulting in variations in the liquid to vapor (L/V) ratio across the cross section of the column. Also, it is known that a significant flow of liquid occurs at the column wall, thereby reducing the liquid loading in the packing in an annular region of the packing adjacent the wall. The vapor flow, although not completely uniform, is more uniform within the packing than is the liquid flow.

Thus, there usually is a systematic variation in the L/V ratio across the cross section of a typical cylindrical packed column as shown schematically in FIG. 2. Referring to FIG. 2, in a typical cylindrical packed column 22, there is an annular space 19 between the column inner wall 40 and the packing, which is disposed between the parallel broken lines 16 (representing the perimeter of a cylindrical layer of packing). The column axis is represented by broken line 15. Broken line 17 represents the "nominal" L/V ratio for theoretical or ideal conditions where there would be no variation in the L/V ratio across the cross section of the column. Solid line 18 is a schematic representation of the non-uniform L/V ratio (relative to nominal) across the cross section of a typical cylindrical packed column. The L/V ratio is much higher near the column inner wall because of excessive liquid flowing down the column inner wall (as indicated by the steep slope of line 18 above annular space 19 in FIG. 2).

The general pattern of the actual L/V ratio illustrated by line 18 in FIG. 2 may vary considerably depending on the details of the packing, the mixture being separated, and the process conditions.

Further, it is well known that maldistribution can result in degradation of the separation efficiency of the column unless it is mitigated by repeated mixing of the liquid and vapor phases within the column. This is especially true for tight separations such as those used in cryogenic air separation.

In terms of mixing characteristics, a small diameter column with a large length to diameter (l/d) ratio (e.g., about 5 to 20) can mix the vapor flow and, to a lesser extent, the countercurrent liquid flow repeatedly across the column cross section, which can average out the consequences of local variations in L/V ratios much better than a large diameter column with a much lower l/d ratio (e.g., about 0.5 to 5.0). For this reason, the degradation in separation efficiency compared to the ideal is more severe in large diameter columns, which results in an increase in HETP.

The increase in HETP in large exchange columns is a major economic penalty, since it increases the overall height of the system of which the column is a part. It is desired to mitigate the increase in HETP in large diameter columns, so that such columns may approach the performance of small diameter columns in terms of separation efficiency.

The prior art has not recognized or addressed this specific problem. The prior art has recognized the deleterious effect of excessive wall liquid flow, and there have been attempts to mitigate that effect, such as by the use of conventional wall wipers. However, although wall wipers can reduce wall liquid flow locally, wall wipers are not very effective in returning liquid back to the packing. Thus, even in columns equipped with wall wipers, there still are unfavorable variations in L/V ratios. The deleterious effect of vapor bypass at the column wall can be mitigated by the use of restricting means in the annular space near the column wall, such as the solid metal wipers and other devices disclosed in the following copending U.S. patent application assigned to the assignee of the instant application: Ser. No. 09/166373 to Klotz, et al. entitled "Devices to Minimize Vapor Bypass in Packed Column and Method of Assembly", now abandoned.

U.S. Pat. No. 5,262,095 (Bosquain et al.) describes the use of packing edge modification by deformation, slits, porous plugs, fillers or special wipers in order to promote a flow reversal of liquid back into the packing and away from the wall of the column. U.S. Pat. No. 5,441,793 (Suess) describes the use of liquid re-director elements at the packing edges near the wall. Such elements may be made out of "L" shaped mini corrugations. U.S. Pat. No. 5,224,351 (Jeannot et al.) describes similar edge modifications by folding some of the corrugation edges near the column wall. U.S. Pat. No. 5,700,403 (Billingham et al.) describes the formation of special corrugated packing layers wherein alternate corrugated elements within a structured packing layer near the wall are cut short so that the tendency to lead liquid towards the wall is reduced. U.S. Pat. No. 5,282,365 (Victor et al.) describes the use of heat addition at the column wall in order to vaporize and reduce wall flow.

While the packings and methods taught in the first four patents may reduce wall liquid flow, the associated costs are expensive, since the manufacturing techniques are unconventional and installation of the packings would likely be labor intensive. The proposed solution of the fifth patent also would be expensive, because it would require additional process circuitry to bring another fluid outside the column in order to evaporate the wall liquid inside the distillation equipment.

U.S. Pat. No. 5,100,448 (Lockett et al.) discloses the use of structured packing of different packing density in at least two sections of a column which are directly above and below each other to balance hydraulic loading. Likewise, in U.S. Pat. No. 5,419,136 (McKeigue) the corrugation angle of the structured packing is varied in two sections which are directly above and below each other for the purpose of balancing hydraulic loading. Although these arrangements of packing reportedly provide improved operating flexibility in cryogenic air separation, they do not address the problems of maldistribution discussed herein, nor do they provide a solution or a suggestion of a solution for any of those problems.

It is desired to have a structured packing which minimizes the effects of maldistribution using a variation of conventional structured packing which does not require any special edge modification of the packing or any additional equipment or circuitry outside the exchange column.

It is further desired to have a structured packing that shows high performance characteristics for cryogenic applications, such as those used in air separation, and for other heat and/or mass transfer applications. Specifically, it is desired to mitigate the increase in HETP in large diameter columns used in such applications, so that such columns approach the performance of small diameter columns in terms of separation efficiency.

It is still further desired to have an exchange column wherein the overall liquid to vapor (L/V) ratio within the column deviates as little as possible from the nominal (excluding wall effects), thereby resulting in an improved mass transfer performance.

It is still further desired to have an exchange column having a structured packing wherein the L/V ratio is maintained nearly constant in the column even if the absolute liquid and vapor flows are not maintained constant.

It is still further desired to balance the L/V ratio across the cross section of an exchange column and to make large diameter columns approach the performance of small diameter columns in mass and/or heat transfer efficiency.

BRIEF SUMMARY OF THE INVENTION

The present invention is a layer of mixed-resistance structured packing, which may be used in one or more sections of an exchange column for exchanging heat and/or mass between a first phase and a second phase in a process, such as cryogenic air separation. The invention also provides a method for assembling such a layer of mixed-resistance structured packing in an exchange column. Other aspects of the invention are a method and a system for reducing HETP (height equivalent to a theoretical plate) in exchange columns.

The mixed-resistance structured packing may be used in one or more layers of packing in one or more sections of an exchange column. In such a layer of mixed-resistance structured packing, lower resistance packing is used in the central core and a higher resistance packing is used in an outer annulus surrounding the central core. This forces more vapor flow toward the center of the exchange column and less toward the column wall, thereby counteracting a tendency of liquid to maldistribute in the exchange column. By using the method of the present invention to balance the L/V ratio (liquid to vapor ratio), large diameter columns approach the performance of small diameter columns in terms of substantially lower HETP.

In one embodiment, the layer of mixed-resistance structured packing comprises: a first structured packing having a first packing resistance; and a second structured packing generally horizontally adjacent the first structured packing, the second structured packing having a second packing resistance different than the first packing resistance.

In one variation, the second structured packing has an inner perimeter substantially equal to the outer perimeter of the first structured packing and an outer perimeter greater than the inner perimeter. The inner perimeter of the second structured packing substantially abuts the outer perimeter of the first structured packing. In another variation, the outer perimeter of the first structured packing and the inner perimeter of the second structured packing are substantially circular.

In another variation, the first and second structured packings comprise at least one corrugated plate. In yet another variation, the first and second structured packings comprise a plurality of corrugated plates made of foil-like material disposed in parallel relation, each said plate having at least one corrugation disposed at an angle and in a crisscrossing relation to at least one corrugation of an adjacent plate. A difference in resistance between the first and second structured packings may be due to a difference in the angles of the corrugations. For example, the angle of the at least one corrugation in the first structured packing may be different than the angle of the at least one corrugation in the second structured packing.

In yet another variation, a difference in resistance between the first and second structured packings is due to a difference in surface area density of the first and second structured packings. For example, the surface area density of the second structured packing may exceed the surface area density of the first structured packing.

Another embodiment of the invention is a layer of mixed-resistance structured packing comprising: a substantially circular central core having an outer perimeter, the central core comprising a first structured packing having a first packing resistance; and an outer annulus generally horizontally adjacent the outer perimeter of the outer core, the outer annulus comprising a second structured packing having a second packing resistance different than the first packing resistance.

Another aspect of the present invention is an exchange column for exchanging heat and/or mass between a first phase and a second phase, the exchange column having at least one layer of mixed-resistance structured packing as in any one of the embodiments or variations described above.

Yet another aspect of the present invention is a process for cryogenic air separation comprising contacting vapor and liquid counter-currently in at least one distillation column containing at least one mass transfer zone wherein liquid-vapor contact is established by at least one layer of mixed-resistance structured packing as in any of the embodiments and variations described above.

The present invention also includes a method for assembling a layer of mixed-resistance structured packing in an exchange column comprising multiple steps. The first step is to provide an exchange column. The second step is to provide a layer of mixed-resistance structured packing, the layer of mixed-resistance structured packing comprising: a first structured packing having a first packing resistance; and a second structured packing generally horizontally adjacent the first structured packing, the second structured packing having a second packing resistance different from the first packing resistance. The final step is to install the layer of mixed-resistance structured packing in the exchange column.

Another aspect of the present invention is a method for reducing HETP (height equivalent to a theoretical plate) in an exchange column for exchanging heat and/or mass between a liquid and a vapor, the exchange column having at least one layer of structured packing, the layer of structured packing having a central core and an outer annulus generally horizontally adjacent the central core. The method comprises the following steps: inducing at least a portion of the vapor in the exchange column away from the outer annulus; and inducing the at least a portion of the vapor toward the central core. In one variation of the method for reducing HETP, the portion of the vapor is an amount whereby the liquid-vapor ratio across a cross section of the exchange column is maintained at nearly a constant value.

Yet another aspect of the invention is a system for reducing HETP in an exchange column for exchanging heat and/or mass between a liquid and a vapor, the exchange column having at least one layer of structured packing, the layer of structured packing having a central core and an outer annulus generally horizontally adjacent the central core. The system comprises: means for inducing at least a portion of a vapor in the exchange column away from the outer annulus; and means for inducing the at least portion of the vapor toward the central core. In one variation of the system, the portion of the vapor is an amount whereby the liquid-vapor ratio across a cross section of the exchange column is maintained at nearly a constant value.

Another aspect of the present invention is a packed section in an exchange column comprising: a first layer of mixed-resistance structured packing (as in any one of the embodiments or variations described above); and a second layer of mixed-resistance structured packing (as in any one of the embodiments or variations described above) located below the first layer of mixed-resistance structured packing, wherein the second layer is rotated at an angle relative to the first layer. The angle may be between about 0° and about 90°.

BRIEF DESCRIPTION OF THE DRAWINGS

The invention will now be described by way of example with reference to the accompanying drawings, in which:

FIG. 8 is a chart illustrating the effect of liquid maldistribution and mixing on two parallel columns with or without balancing vapor distribution.

DETAILED DESCRIPTION OF THE INVENTION

For ease of discussion, the present invention is described using conventional structured packing elements, bricks, and layers illustrated in FIGS. 4A through 5B and discussed below. However, the invention also may be used with other types of structured packing, including but not limited to the types of packings disclosed in the following copending U.S. patents assigned to the assignee of the instant application: U.S. Pat. No. 6,119,481 to Sunder entitled "Horizontal Structured Packing"; U.S. Pat. No. 5,901,575 to Sunder entitled "Stackable Structured Packing with Controlled Symmetry"; and U.S. Pat. No. 5,876,638 to Sunder entitled "Structured Packing Element with Bi-Directional Surface Texture and a Mass and Heat Transfer Process Using Such Packing Element".

Figure 3:
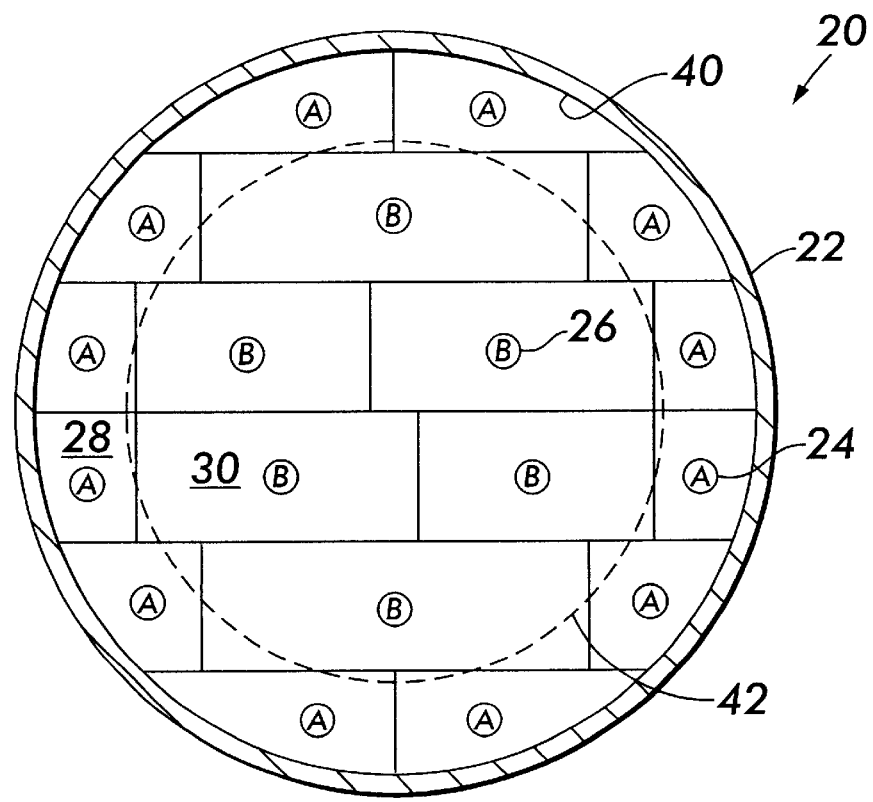
FIG. 3 is a schematic diagram of a plan view of a layer of mixed-resistance structured packing in an exchange column.

Referring to FIG. 3, the present invention is discussed with reference to a layer of structured packing 20 within a section of a packed column 22 wherein the layer includes a higher resistance packing 24 (identified by "A") and a lower resistance packing 26 (identified by "B") in the configuration illustrated in FIG. 3. (As discussed below and illustrated in FIGS. 4A through 5B, a "layer" is typically made from a plurality of "bricks" of packing elements or sheets that fit together to fill the cross section of a column.) As shown in FIG. 3, the higher resistance packing ("A") is in the outer annulus 28 and the lower resistance packing ("B") is in the central core 30.

An "annulus" is defined as the portion of a plane bounded by two concentric circles in the plane. As used herein for the embodiment shown in FIG. 3, the term "outer annulus" 28 is the portion of the plane bounded by the substantially circular inner wall 40 of the column 22 and the concentric circle 42 defining the perimeter of the "central core" 30.

Although the boundary between the central core 30 and the outer annulus 28 is illustrated as a circle 42 in FIG. 3, for manufacturing reasons the boundary in actual practice is a jagged boundary having a series of straight lines roughly approximating circle 42. The segmentation of the layer illustrated in FIG. 3 is only one example. Many other variations are possible, depending on the column diameter and the packing dimensions.

The invention is not limited to the configuration shown in FIG. 3, nor is it limited to the use of only two packings of two different resistance levels. Persons skilled in the art will recognize that other configurations may be used and that more than two different packings having different resistances may be used.

As illustrated in FIG. 3, the relative sizes of the outer annulus 28 and the central core 30 are determined by the diameter of circle 42 (i.e., the perimeter of the central core). For a given size column 22, if the central core 30 is relatively larger (i.e., circle 42 has a larger diameter) than that shown in FIG. 3, then the outer annulus 28 will be relatively smaller than that shown in FIG. 3. Conversely, if the central core is relatively smaller (i.e., circle 42 has a smaller diameter) than that shown in FIG. 3, then the outer annulus will be relatively larger than that shown in FIG. 3. Persons skilled in the art will recognize that numerous variations are possible, as the diameter of circle 42 can range from a lower limit near zero to an upper limit near the diameter of inner wall 40.

Although the preferred embodiment utilizes a circular central core 30 in a packed column 22 having a circular inner wall 40, other combinations are possible. For example, the shapes of the inner wall 40 of column 22 and/or the perimeter 42 of the central core 30 may be other than circular. In those cases, the "outer annulus" 28 would not have the actual geometric shape of an "annulus" as defined above. Instead, the outer annulus would be in the form of a geometric shape having an outer perimeter defined by inner wall 40 and an inner perimeter defined by the outer perimeter 42 of the central core 30.

Referring to the embodiment illustrated in FIG. 3, the present invention works by counteracting the depletion of liquid flow in the outer annulus 28 of the packing by inducing a similar reduction in the vapor flow within the outer annulus. This can be accomplished by mixing resistances in such a way that the outer annulus of some or all layers within a section has a higher resistance packing 24 and the central core 30 has a lower resistance packing 26, wherein the term resistance refers primarily to the resistance relative to the vapor flow.

Mixed resistances may be obtained by varying one or more of the following variables between the central core 30 and the outer annulus 28—corrugation angle, surface area density, surface texture, perforations, packing types, or other variables which change the resistance characteristics of the packing.

By inducing less vapor flow in the outer annulus 28 and more vapor flow toward the central core 30, the overall liquid to vapor (L/V) ratio within the column 22 shows less deviation from the nominal and thereby the mass transfer performance improves in terms of the required HETP. For commercial columns, reductions in heights can reduce the overall pressure drop in spite of increased resistance in the outer annulus. With the resulting balancing of the liquid to vapor flow (L/V) ratios, at least some of the degradation in the HETP of large industrial columns can be reclaimed. This can result in much lower section heights, which translates into a reduction in the overall cost of a system.

Figure 4A:
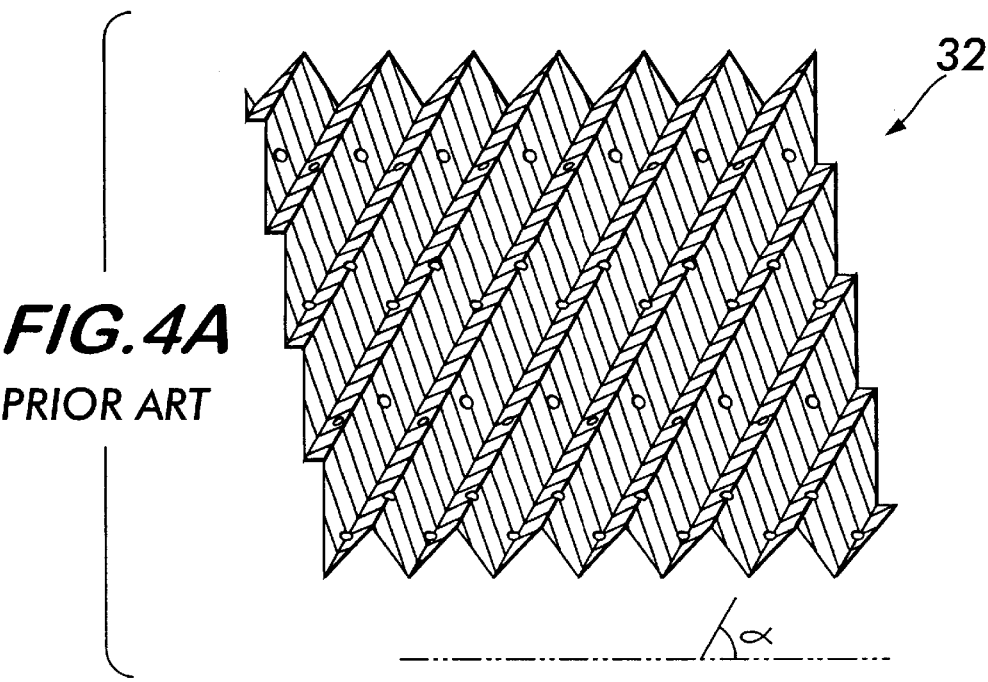
FIG. 4A is a perspective view of a conventional structured packing element.

The conventional technology for using structured packing has been described in many of the patents pertaining to structured packing that followed U.S. Pat. No. 4,296,050 (Meier), which describes corrugated structured packing and its applications. A basic conventional structured packing element 32 is shown in FIG. 4A. Each packing element is made of thin metal foil or other suitable material which is corrugated. A distillation column 22 packed with conventional structured packing is illustrated in FIGS. 5A and 5B.

Figure 4B:
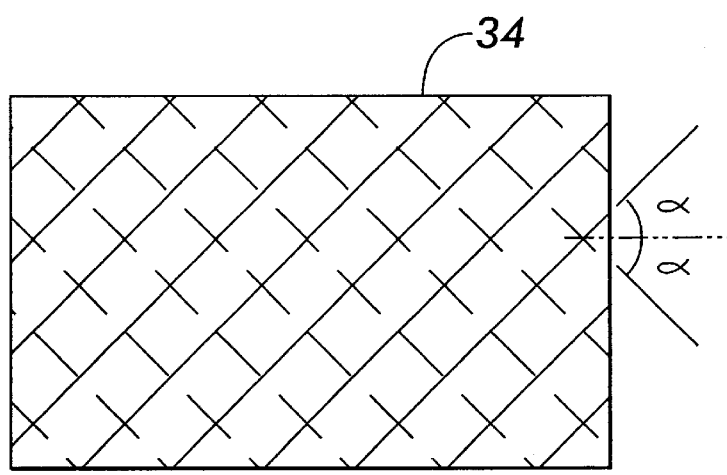
FIG. 4B is a schematic diagram illustrating the crisscrossing arrangement of adjacent elements in conventional structured packing.

A typical structured packing employs vertically-oriented corrugated packing sheets or elements such as that in FIG. 4A wherein the corrugations are arranged at an angle to the vertical. Each packing sheet is positioned such that its corrugation direction is reversed from the corrugation direction of its adjacent packing sheet, as illustrated in FIG. 4B. (The solid diagonal lines represent the corrugations of one packing sheet, and the broken diagonal lines represent the corrugations of an adjacent packing sheet.) When placed in the vertical for use in a distillation column the corrugations form an angle ( ) with the horizontal. In addition to being corrugated, the elements or sheets may have surface texture, holes or other orifices, dimples, grooves, or other features which can enhance the performance of the basic element.

Figure 4C:
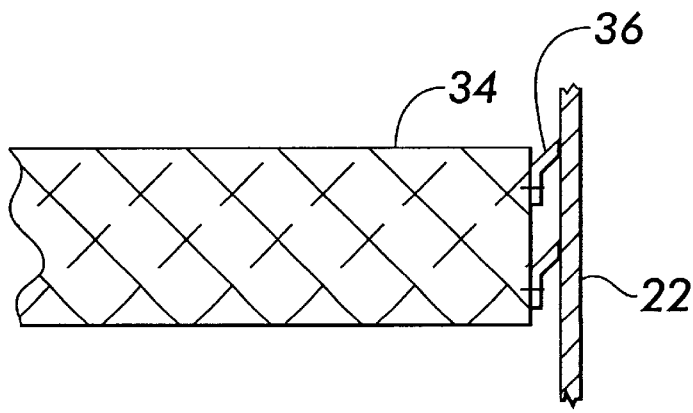
FIG. 4C is a schematic diagram illustrating the use of wall wipers in a packed column.

Using such basic packing elements, a "brick" 34 of structured packing is made by assembling the elements (typically about 40 to 50 elements per brick) such that the corrugations of adjacent elements are arranged in the criss-crossing fashion shown in FIG. 4B. (The means used to secure the elements in place are not shown.) When the bricks are placed within a cylindrical column, the edges of the bricks near the wall are rough and jagged, creating gaps. To reduce liquid bypass, wipers 36 typically are used as shown in FIG. 4C.

Figure 5A:
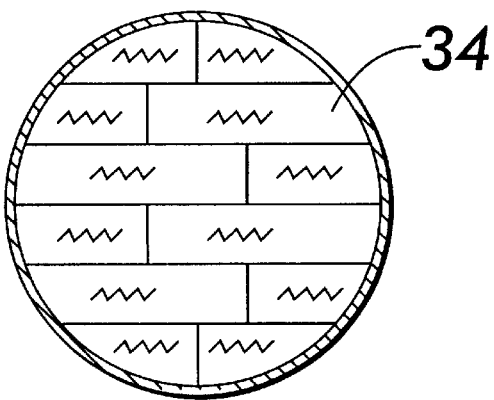
FIG. 5A is a schematic diagram of a plan view of an arrangement of bricks of structured packing at one elevation at a sectional view taken along line 5A—5A in FIG. 5B.
Figure 5B:
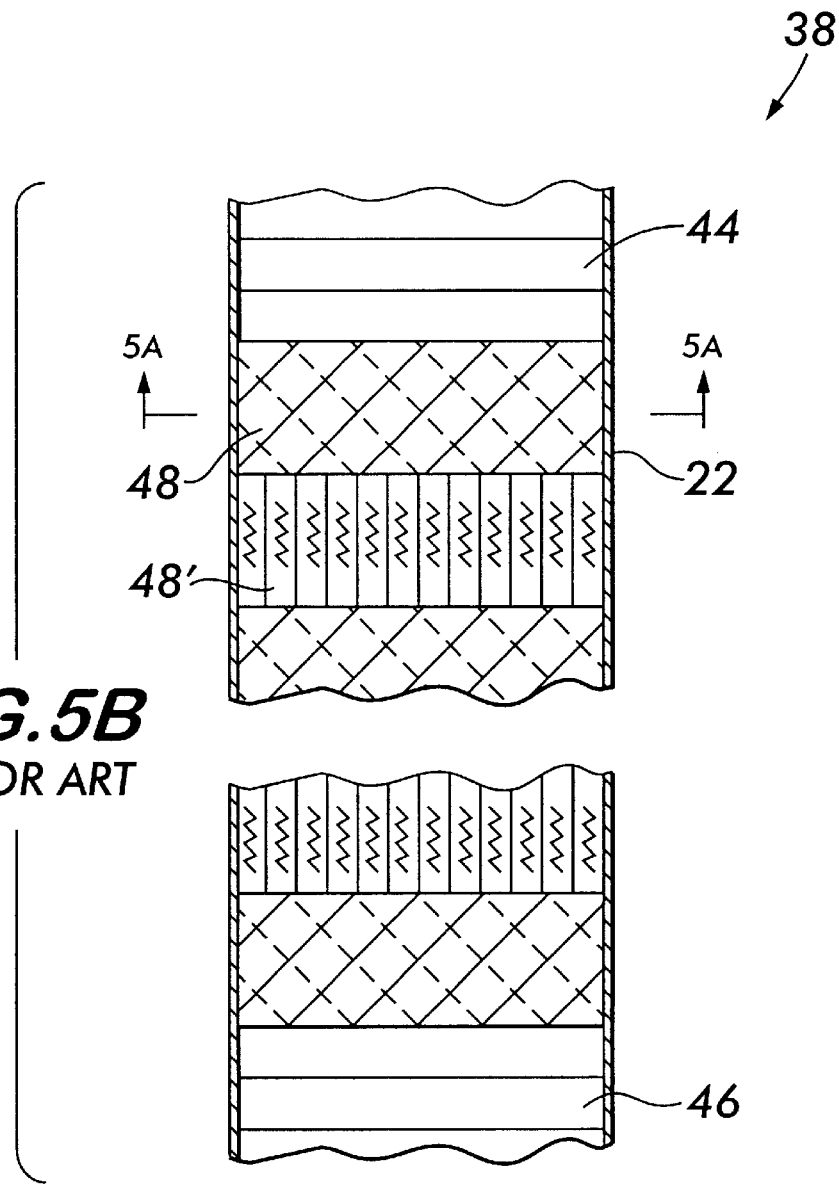
FIG. 5B is a schematic diagram of an elevation view of an arrangement of a plurality of layers of structured packings between liquid and vapor distributors in a section of a distillation column.

Structured packing bricks 34 typically are assembled into layers (48, 48') in a section of a distillation column 38 as shown in FIGS. 5A and 5B. FIG. 5A is a plan view which shows the arrangement of about twelve bricks at one elevation as a sectional view at 5A—5A in FIG. 5B. FIG. 5B shows an elevation view of the entire arrangement of a structured packing column having a plurality of layers (48, 48') in a section between a liquid distributor 44 and a vapor distributor 46, wherein successive layers (48, 48') of packing (typically about 8 inches high per layer) are rotated relative to each other at right angles (i.e., 90°). This is the most common arrangement, but other rotation patterns can be used (e.g., where successive layers are rotated at an angle between about 0° and about 90°).

The present invention modifies the arrangement of conventional packing, as discussed below. In conventional packing, the bricks 34 at one elevation, such as shown in FIG. 5A, are all formed from identical elements 32, as shown in FIG. 4A. The present invention uses at least two different types of the basic elements, depending on the location of the bricks, as shown in FIG. 3. Those located in the outer annulus 28 are formed of elements that provide a higher resistance to vapor flow, and those in the central core 30 are formed of elements that provide a lower resistance to vapor flow.

The differences in resistance may be due to differences in the surface area density, which usually is expressed in terms of $m^2/m^3$ of the volume occupied by the packing. (The term "surface area density" means the surface area of the structured packing per unit volume of the structured packing.) Thus, the surface area density of the packing used in the outer annulus 28 would be higher relative to the surface area density of the packing in the central core 30.

Alternatively, while retaining the same surface area density in both the outer annulus 28 and the central core 30, a packing having a lower corrugation angle could be used in the outer annulus 28 relative to the corrugation angle of a packing in the central core 30. In addition, other surface features also may be mixed to differentiate the packings between the outer annulus and the central core. These features include textures, holes or orifices, dimples, grooves, shapes of the corrugations, waves, or other means which may be mixed singularly or simultaneously in combination with other features to achieve the purpose of varying the resistance to vapor flow between the outer annulus and the central core.

Other variations and extensions of these concepts will be obvious to persons skilled in the art. For example, variations could include more than two resistances in each layer in several sequential annular sections, or application of mixed resistances in only some, but not all, layers of a packed section. This general technique also may be applied to any heat and mass exchange column which has counter flowing liquid and vapor (or gas phases) and which exhibits systematic maldistribution such as described above. The present invention also is not limited to distillation or to cryogenic distillation applications.

The present invention is explained further by the analysis below. Although the present invention has more general applicability, for ease of discussion of the analysis, the analysis refers to the separation of argon and oxygen in a conventional two-column air separation plant.

Figure 1:
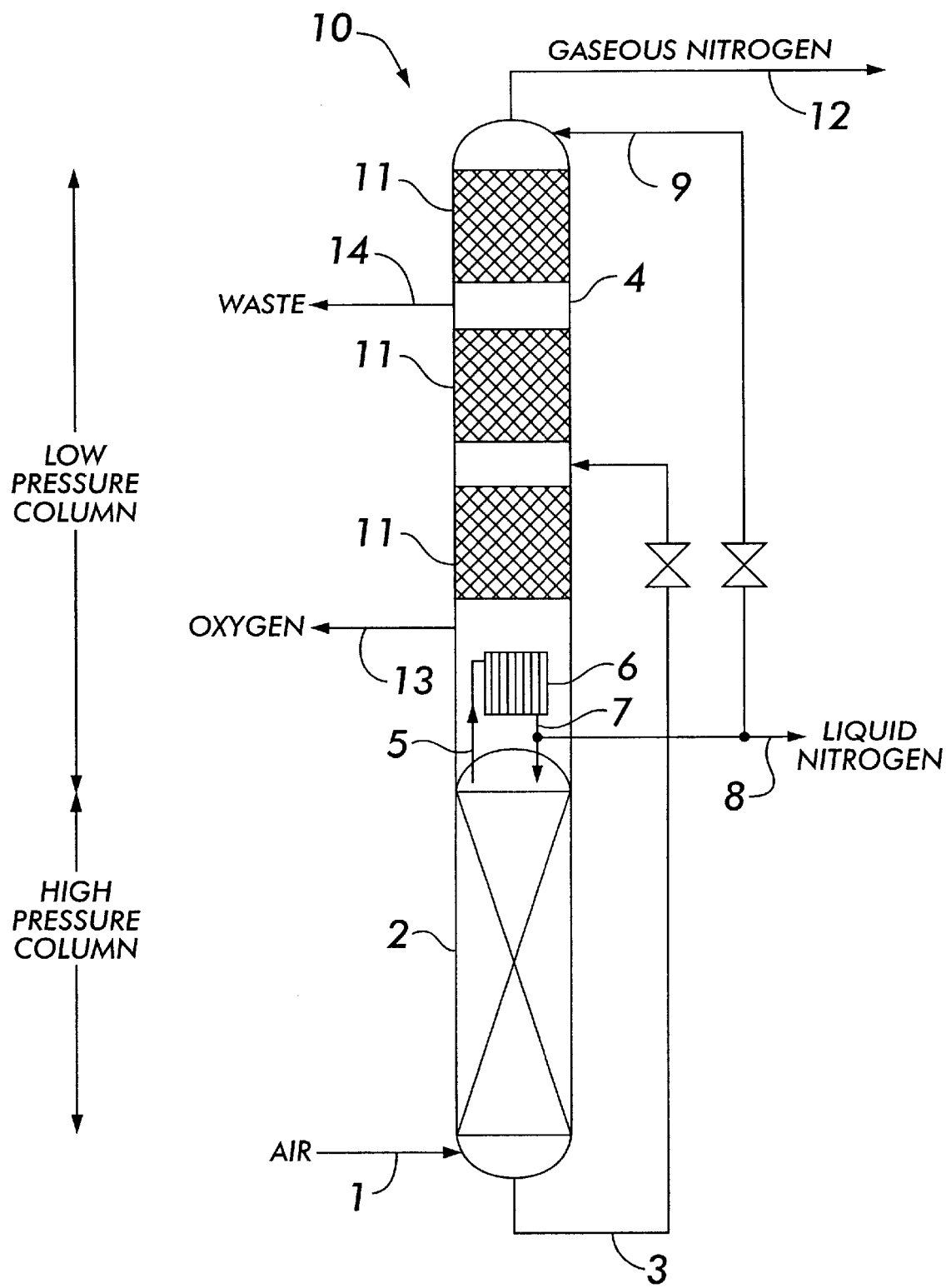
FIG. 1 is a schematic illustration of an air separation unit.
Figure 2:
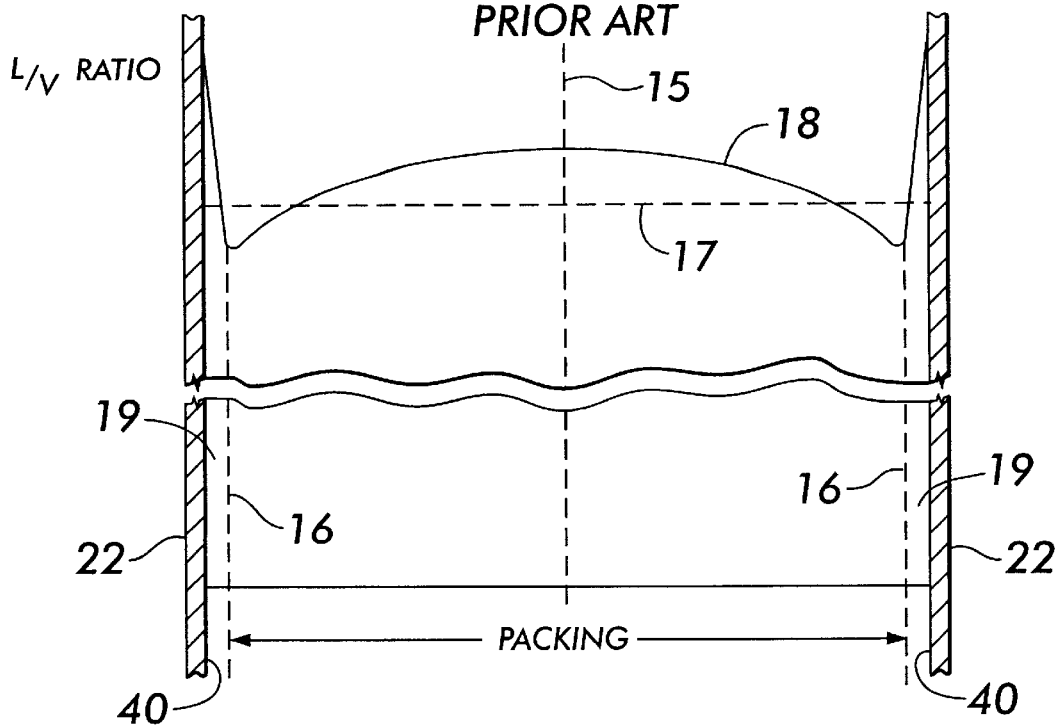
FIG. 2 illustrates the L/V ratio non-uniformity in a typical cylindrical distillation column using conventional structured packing.

Sample calculations of the consequences of imbalance of the L/V ratio and the corrective effect of the current invention are provided below. The separation example represents the bottom of a low pressure column 4 in a conventional two-column air separation plant 10, such as that shown in FIG. 1.

Figure 6:
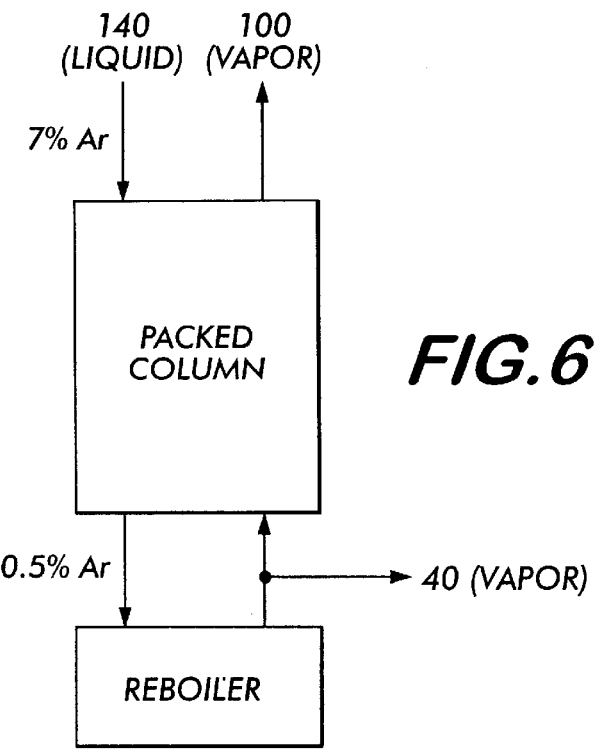
FIG. 6 is a schematic diagram illustrating the flows of liquid and vapor in a low pressure column of a conventional two-column air separation unit.

The assumed conditions for the calculations are shown in FIG. 6. In addition, the following parameters were assumed: argon/oxygen mixture; 25 psia; 25 theoretical stages; nominal L/V=1.4. Calculations were first performed to compute the ideal separation under uniform flow conditions. Those results were then compared with a separation when the column is split into two parallel columns of equal area having different L/V ratios within the columns. As some mixing occurs in real columns, the level of mixing was studied as a variable between 0 and 3 intermediate mixes.

Figure 7:
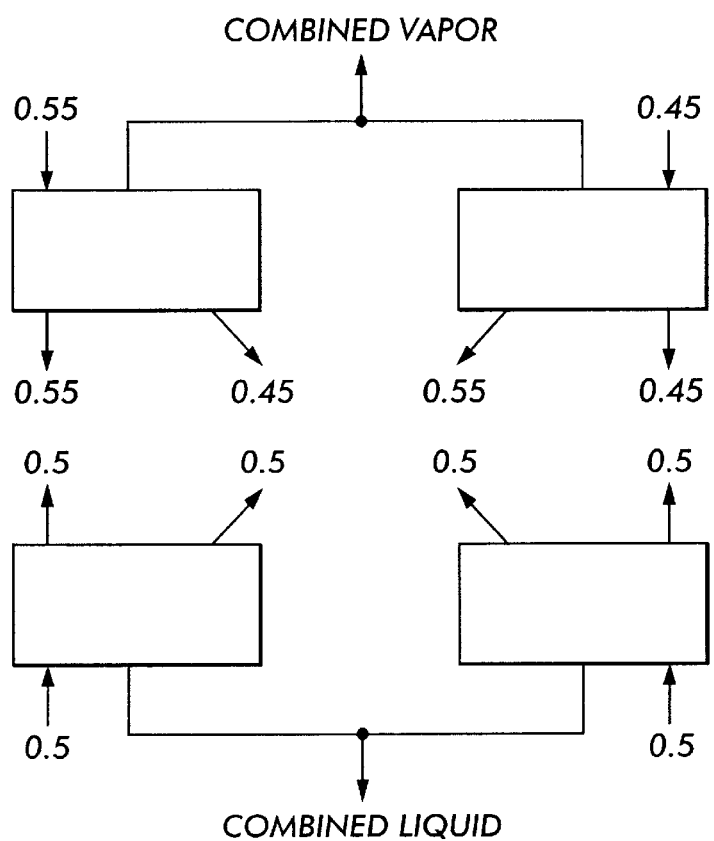
FIG. 7 is another schematic diagram illustrating the flows of liquid and vapor in a low pressure column in a two-column air separation unit.

An example of a specific mixing pattern is shown schematically in FIG. 7. (Other mixing patterns may be obtained in a similar manner.) FIG. 7 provides an example of relative flows, assuming only liquid maldistribution with one intermediate mix. The relative flow splits for liquid are indicated in the upper portion of the diagram, and the relative flow splits for vapor are indicated in the lower portion of the diagram.

The consequences of the present invention were calculated by showing the effect of rebalancing the L/V ratios in the two parallel columns, although with different absolute flows. The parameters used in these calculations were: $Ar/O_2$ binary, 25 psia, L/V 1.4, 7% Ar in liquid at the top, 0.5% Ar at the bottom and 25 theoretical stages. The results of the calculations are shown in FIG. 8 and tabulated below.

| Maldistribution: +/-% | L maldist 0 mixes | L maldist 1 mix | L maldist 2 mixes | L&V maldist 0 mixes | L&V maldist 1 mix | L&V maldist 2 mixes |
|---|---|---|---|---|---|---|
| \multicolumn{7}{l}{Calculated relative packed column lengths to accomplish the same separation.} |
| 0.0 | 1.0000 | 1.0000 | 1.0000 | 1.0000 | 1.0000 | 1.0000 |
| 2.6 | 1.0539 | | | 1.0000 | | |
| 5.0 | 1.2880 | 1.0452 | | 1.0003 | 1.0003 | |
| 10.0 | | 1.2400 | 1.0928 | | 1.0015 | 1.0015 |
| 15.0 | | | 1.2650 | | | 1.0030 |

The findings from these calculations are as follows. First, the HETP of an ideal column stated in relative terms is 1.

This is shown in FIG. 8 by all the cases which have 0 maldistribution within the two parallel columns. The number of intermediate mixes has no effect on this calculation. But when liquid maldistribution is imposed at ±2.6%, 5%, 10% and 15% in the two columns relative to the mean, the overall HETP increases. The graphed results in FIG. 8 show that the relative HETP increases with increasing level of liquid maldistribution. While intermediate mixing mitigates this effect, it does not eliminate it. In contrast, providing a counterbalancing vapor maldistribution to restore the L/V ratios between the two parallel columns practically eliminates the problem. For instance, if the liquid maldistribution is ±5%, then HETP increases to a relative value of 1.288. One (1) intermediate mix reduces this to only 1.045. However, if counterbalancing vapor flow is induced in the same proportion in order to restore the L/V ratio to 1.4 in both columns, then the HETP goes back down to 1.0003, even with no mixing. Similarly, with ±15% liquid maldistribution, even with 2 intermediate mixes, relative HETP increases to 1.265. Restoring L/V ratio by counter balancing vapor flow reduces the HETP to 1.003.

The calculations show that it is very important to maintain the L/V ratio nearly constant in a distillation column even if the absolute liquid and vapor flows cannot be maintained constant. The calculations also show that intermediate mixing mitigates the effects of maldistribution. But as mixing is increasingly limited when the column diameter increases, a secondary means, such as taught by the present invention, can improve the performance of the column.

It should be noted that the above calculations were performed with several specific assumptions as an example only. If changes are made in the specific mixture, or the process conditions, or the maldistribution and mixing patterns, the results will show the same qualitative trends even though there may be changes in quantitative terms. Thus, the present invention has very general applicability to contact towers that have liquid and gas or vapor flowing in countercurrent directions. It can apply to cryogenic and non-cryogenic distillation, as well as any heat exchange and/or mass exchange operation which uses structured packing as the contacting means.

The present invention uses a variation with existing conventional structured packing which does not require any special edge modification of the packing within the column or any additional equipment or circuitry outside the column. Also, rather than attempting to eliminate the liquid flow variation, it counters that variation by inducing a similar flow variation in the vapor flow such that the L/V ratio variation is minimized.

The concept of using mixed resistances within a single layer so that there are differences in resistance between the central core and the outer annulus of a column has not been suggested in the prior art. It is customary to use the same packing within the entire packed section. The prior art does use different packings in completely separate packed sections within a packed column, which can be done by varying surface area, corrugation angle, or other means. (For example, see U.S. Pat. No. 5,100,448 (Lockett et al.)). But that is completely different from the present invention in structural arrangement, as well as in the intended purpose. The purpose of those prior art arrangements is to get even approach to flooding between different sections of a distillation column, while the purpose of the current invention is to balance L/V ratios across the cross section of a column and to make large columns approach small columns in mass and/or heat transfer efficiency.

Various embodiments of the present invention have been described with particular reference to the examples illustrated. However, it should be appreciated that variations and modifications may be made to those embodiments and examples without departing from the spirit and scope of the invention as defined in the appended claims.

What is claimed is:

1. A mixed resistance structured packing comprising a plurality of layers of packing for an exchange column, each of said layers comprising:

a central core having an outer perimeter, the central core comprising a first structured packing having a first packing resistance; and an outer annulus horizontally adjacent the outer perimeter of the central core, the outer annulus comprising a second structured packing having a second packing resistance higher than the first packing resistance;

whereby vapor flow is increased toward the center of the exchange column and decreased toward a column wall of the exchange column in all of said plurality of layers.

2. A mixed-resistance structured packing as in claim 1, wherein:

the first structured packing has an outer perimeter;

the second structured packing has an inner perimeter substantially equal to the outer perimeter of the first structured packing and an outer perimeter greater than the inner perimeter; and the inner perimeter of the second structured packing substantially abuts the outer perimeter of the first structured packing.

3. A mixed-resistance structured packing as in claim 2, wherein the outer perimeter of the first structured packing and the inner perimeter of the second structured packing are substantially circular.

4. A mixed resistance structured packing comprising a plurality of layers of packing for an exchange column, each of said layers comprising:

a substantially circular central core having an outer perimeter, the central core comprising a first structured packing having a first packing resistance; and an outer annulus generally horizontally adjacent the outer perimeter of the central core, the outer annulus comprising a second structured packing having a second packing resistance higher than the first packing resistance;

whereby vapor flow is increased toward the center of the exchange column and decreased toward a column wall of the exchange column in all of said plurality of layers.

5. A mixed-resistance structured packing as in claim 1, wherein the first and second structured packings comprise at least one corrugated plate.

6. A mixed resistance structured packing comprising a plurality of layers of packing for an exchange column, each of said layers comprising:

a central core having an outer perimeter, the central core comprising a first structured packing having a first packing resistance; and an outer annulus horizontally adjacent the outer perimeter of the central core, the outer annulus comprising a second structured packing having a second packing resistance higher than the first packing resistance, wherein the first and second structured packings comprise a plurality of corrugated plates made of foil-like material disposed in parallel relation, each said plate having at least one corrugation disposed at an angle and in crisscrossing relation to at least one corrugation of an adjacent plate.

7. A mixed-resistance structured packing as in claim 6, wherein the angle of the at least one corrugation in the first structured packing is different than the angle of the at least one corrugation in the second structured packing.

8. A mixed-resistance structured packing as in claim 1, wherein a surface area density of the second structured packing exceeds a surface area density of the first structured packing.

9. An exchange column for exchanging heat and/or mass between a first phase and a second phase, the exchange column having the mixed-resistance structured packing as in claim 1.

10. A packed section in an exchange column, comprising:
- a first layer of the plurality of layers of the mixed-resistance structured packing as in claim 1; and
- a second layer of the plurality of layers of the mixed-resistance structured packing as in claim 1 located below the first layer of mixed-resistance structured packing, wherein the second layer is rotated at an angle relative to the first layer.

11. A packed section as in claim 10, wherein the angle is between about 0° and about 90°.

* * * * *